United States Patent
Xiao et al.

(10) Patent No.: US 11,699,930 B2
(45) Date of Patent: Jul. 11, 2023

(54) ROTOR STRUCTURE, PERMANENT MAGNET AUXILIARY SYNCHRONOUS RELUCTANCE MOTOR AND ELECTRIC VEHICLE

(71) Applicant: GREE ELECTRIC APPLIANCES, INC. OF ZHUHAI, Guangdong (CN)

(72) Inventors: Yong Xiao, Zhuhai (CN); Yusheng Hu, Zhuhai (CN); Bin Chen, Zhuhai (CN); Tong Tong, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 302 days.

(21) Appl. No.: 16/979,827

(22) PCT Filed: Dec. 7, 2018

(86) PCT No.: PCT/CN2018/119874
§ 371 (c)(1),
(2) Date: Sep. 10, 2020

(87) PCT Pub. No.: WO2019/174325
PCT Pub. Date: Sep. 19, 2019

(65) Prior Publication Data
US 2021/0057946 A1    Feb. 25, 2021

(30) Foreign Application Priority Data

Mar. 16, 2018    (CN) .......................... 201810218934.0

(51) Int. Cl.
*H02K 1/27*    (2022.01)
*H02K 1/276*    (2022.01)
*B60K 1/00*    (2006.01)

(52) U.S. Cl.
CPC ................ *H02K 1/276* (2013.01); *B60K 1/00* (2013.01); *H02K 2213/03* (2013.01)

(58) Field of Classification Search
CPC .... H02K 1/276; H02K 2213/03; H02K 1/246; H02K 1/2766; H02K 29/03; B60K 1/00; Y02T 10/64
See application file for complete search history.

(56) References Cited

U.S. PATENT DOCUMENTS

| | | |
|---|---|---|
| 2014/0042860 A1 | 2/2014 | Rahman et al. |
| 2017/0057373 A1* | 3/2017 | Hao .......................... H02K 3/28 |

(Continued)

FOREIGN PATENT DOCUMENTS

| | | |
|---|---|---|
| CN | 106936284 A | 7/2017 |
| CN | 107222047 A | 9/2017 |

(Continued)

OTHER PUBLICATIONS

Machine Translation, Helmer, DE-102016212022-A1, Jan. 2018. (Year: 2018).*

(Continued)

*Primary Examiner* — Thomas Truong
(74) *Attorney, Agent, or Firm* — J. Miguel Hernandez; James R. Gourley; Carstens, Allen & Gourley, LLP

(57) ABSTRACT

Disclosed are a rotor structure, a permanent magnet auxiliary synchronous reluctance motor, and an electric vehicle. The rotor structure includes a rotor body provided with a permanent magnet slot group; the permanent magnet slot group includes an outer layer of permanent magnet slot and an inner layer of permanent magnet slot; a magnetic conduction channel is formed between the outer layer of permanent magnet slot and the inner layer of permanent magnet slot; the magnetic conduction channel is provided with a connection hole.

18 Claims, 8 Drawing Sheets

(56) References Cited

U.S. PATENT DOCUMENTS

2017/0187257 A1    6/2017  Liu et al.
2017/0373573 A1   12/2017  Sidiropoulos

FOREIGN PATENT DOCUMENTS

| CN | 104838564    | A    | 10/2017 | |
|----|--------------|------|---------|---|
| CN | 107565723    | A    | 1/2018  | |
| CN | 108321951    | A    | 7/2018  | |
| CN | 208015468    | U    | 10/2018 | |
| DE | 102016212022 | A1 * | 1/2018  | ............... H02K 1/27 |
| DE | 102016212022 | A1   | 1/2018  | |
| DE | 102016225890 | B3   | 5/2018  | |
| EP | 2889987      | A2   | 7/2015  | |
| EP | 3029808      | A1   | 6/2016  | |
| FR | 3019948      | A1   | 10/2015 | |

OTHER PUBLICATIONS

English translation of CN 106936284 A published on Jul. 7, 2017 (9 pages).
Extended European Search Report for European Application No. 18910127.2 dated Mar. 31, 2021 (10 pages).
Office Action for Chinese Application No. CN-201810218934.0 dated Mar. 25, 2019 (8 pages).
International Search Report for Application No. PCT/CN2018/119874 dated Feb. 27, 2019 (5 pages).

* cited by examiner

ROTOR STRUCTURE, PERMANENT MAGNET AUXILIARY SYNCHRONOUS RELUCTANCE MOTOR AND ELECTRIC VEHICLE

CROSS REFERENCE TO RELATED APPLICATION

This application is a U.S. National Stage of International Application No. PCT/CN2018/119874, entitled "Rotor Structure, Permanent Magnet Auxiliary Synchronous Reluctance Motor and Electric Vehicle," filed on Dec. 7, 2018 and published as WO 2019/174325 on Sep. 19, 2019, which claims priority to Chinese Patent Application No. 201810218934.0, entitled "Rotor Structure, Permanent Magnet Auxiliary Synchronous Reluctance Motor and Electric Vehicle," filed on Mar. 16, 2018. Each application, publication, and patent listed in this paragraph is hereby incorporated by reference in its entirety as an example.

TECHNICAL FIELD

The present disclosure relates to the field of motor equipment technology, and more particularly to a rotor structure, a permanent magnet auxiliary synchronous reluctance motor, and an electric vehicle.

BACKGROUND

In order to increase the mechanical strength of the rotor, the existing permanent magnet auxiliary synchronous reluctance motor is generally provided with a rotor connection hole on the rotor, and a structural reinforcing rod such as a rivet or a screw is placed in the connection hole. In general, there are two arrangement modes for the rotor connection hole. In one arrangement mode, the connection hole is located between the permanent magnet slot and the shaft hole. Since an area in which the rotor is easily deformed is an area outside the permanent magnet slot when the rotor rotates at a high speed, such connection hole at a bottom of the rotor is less effective in suppressing the deformation of the rotor. In the other arrangement mode, the rotor connection hole is located at an outermost area of the permanent magnet slot, so that the deformation of the rotor in this area can be effectively reduced. However, in this manner, the magnetic field lines of the permanent magnet are easily blocked from entering the stator, which may cause problems such as a reduced motor efficiency.

SUMMARY

The main objective of the present disclosure is to provide a rotor structure, a permanent magnet auxiliary synchronous reluctance motor, and an electric vehicle, to solve problems of easy deformation of rotor and low efficiency of motor in the prior art.

In order to achieve the above objective, according to one aspect of the present disclosure, a rotor structure is provided, including: a rotor body provided with a permanent magnet slot group, the permanent magnet slot group including an outer layer of permanent magnet slot and an inner layer of permanent magnet slot, a magnetic conduction channel being formed between the outer layer of permanent magnet slot and the inner layer of permanent magnet slot, the magnetic conduction channel being provided with a connection hole.

In an embodiment, a width of the magnetic conduction channel adjacent to an outer edge of the rotor body is DT1, a width of the magnetic conduction channel adjacent to a rotating shaft hole of the rotor body is DT2, a diameter of the connection hole is DK, satisfying $(DT1+DK) \leq DT2$.

In an embodiment, $1.3 \times DT1 \leq DT2$.

In an embodiment, the outer layer of permanent magnet slot includes: a first outer layer of permanent magnet slot located on a first side of a direct axis of the rotor body, a first end of the first outer layer of permanent magnet slot being arranged to extend toward the rotating shaft hole of the rotor body and gradually approach the direct axis of the rotor body, a second end of the first outer layer of permanent magnet slot being arranged to extend toward the outer edge of the rotor body and gradually away from the direct axis of the rotor body; and a second outer layer of permanent magnet slot located on a second side opposite to the first side of the direct axis of the rotor body, a first end of the second outer layer of permanent magnet slot being arranged to extend toward the rotating shaft hole of the rotor body and gradually approach the direct axis of the rotor body, a second end of the second outer layer of permanent magnet slot being arranged to extend toward the outer edge of the rotor body and gradually away from the direct axis of the rotor body.

In an embodiment, the first end of the first outer layer of permanent magnet slot is in communication with the first end of the second outer layer of permanent magnet slot.

In an embodiment, the outer layer of permanent magnet slot further includes: an air slot, a first end of the air slot (113) being in communication with the first end of the first outer layer of permanent magnet slot, and a second end of the air slot being is in communication with the first end of the second outer layer of permanent magnet slot.

In an embodiment, the outer layer of permanent magnet slot further includes: a first bent slot, a first end of the first bent slot being in communication with the second end of the first outer layer of permanent magnet slot, a second end of the first bent slot being arranged to extend toward the outer edge of the rotor body and gradually away from the direct axis of the rotor body, a first angle being formed between a geometric central line of the first bent slot and a geometric central line of the first outer layer of permanent magnet slot.

In an embodiment, a width of the first bent slot is gradually decreased from the first end to the second end of the first bent slot.

In an embodiment, a distance from an end of a side wall of the first bent slot adjacent to the direct axis of the rotor body to an extension line of a side wall of the first outer layer of permanent magnet slot away from the direct axis of the rotor body is Ga, satisfying $Ga = N \times g$, g is a length of an air gap between a stator and a rotor, and N is an integer.

In an embodiment, the outer layer of permanent magnet slot further includes: a second bent slot, a first end of the second bent slot being in communication with the second end of the second outer layer of permanent magnet slot, and a second end of the second bent slot being arranged to extend toward the outer edge of the rotor body and gradually away from the direct axis of the rotor body, a second angle being formed between a geometric central line of the second bent slot and a geometric central line of the first outer layer of permanent magnet slot.

In an embodiment, the rotor structure further includes: a plurality of permanent magnets, the plurality of permanent magnets being respectively disposed in the first outer layer of permanent magnet slot, the second outer layer of permanent magnet slot, and the inner layer of permanent magnet slot.

In an embodiment, lengths of the permanent magnets respectively disposed in the first outer layer of permanent magnet slot and the second outer layer of permanent magnet slot are L, and a maximum width between the permanent magnet disposed in the first outer layer of permanent magnet slot and the permanent magnet disposed in the second outer layer of permanent magnet slot is C, satisfying $0.8 \times C \leq L$.

In an embodiment, a permanent magnet is disposed in the first outer layer of permanent magnet slot, a third angle $\alpha 1$ is formed between a connection line which is formed by connecting a side wall of the permanent magnet (20) adjacent to the direct axis of the rotor body and adjacent to an edge of the rotor body with the rotating shaft hole 14 of the rotor body, and the direct axis of the rotor body; a permanent magnet is disposed in the inner layer of permanent magnet slot, a fourth angle $\alpha 2$ is formed between a connection line which is formed by connecting a side wall of the permanent magnet adjacent to the direct axis of the rotor body and adjacent to the edge of the rotor body with the rotating shaft hole 14 of the rotor body, and the direct axis of the rotor body, satisfying $1.5 \times (\sin \alpha 1 / \sin \alpha 2) \leq S1/S2 \leq 1.8 \times (\sin \alpha 1 / \sin \alpha 2)$, S1 is a sum of a surface area of one side of the permanent magnet disposed in the first outer layer of permanent magnet slot adjacent to the direct axis of the rotor body and a surface area of one side of the permanent magnet disposed in the second outer layer of permanent magnet slot adjacent to the direct axis of the rotor body, and S2 is a surface area of one side of the permanent magnet disposed in the inner layer of permanent magnet slot adjacent to the direct axis of the rotor body.

In an embodiment, a midpoint of a connection line formed by connecting a midpoint of a side wall of the air slot adjacent to an edge of the rotor body with the edge of the rotor body is a point P, a distance between the rotating shaft hole of the rotor body and the point P is taken as a radius, a circular arc is made with the radius along a circumferential direction of the rotor body, a sum of thicknesses of the permanent magnets intersecting the circular arc is M1, and a circumference of the circular arc is C1, satisfying $M1/C1=T2$, and $55\% \leq T2 \leq 65\%$.

In an embodiment, a width of the magnetic conduction channel is gradually decreased outwardly in a radial direction of the rotor body.

In an embodiment, a number of at least one of the outer layer of permanent magnet slot and the inner layer of permanent magnet slot is multiple.

In an embodiment, the inner layer of permanent magnet slot has a U-shaped structure, an arc-shaped portion of the inner layer of permanent magnet slot is arranged to protrude toward the rotating shaft hole 14 of the rotor body.

According to another aspect of the present disclosure, a permanent magnet auxiliary synchronous reluctance motor is provided, including a rotor structure, the rotor structure is the same as that mentioned above.

According to another aspect of the present disclosure, an electric vehicle is provided, including a rotor structure, the rotor structure is the same as that mentioned above.

According to the technical solution of the present disclosure, by providing the connection hole on the magnetic conduction channel formed between the outer layer of permanent magnet slot and the inner layer of permanent magnet slot, the deformation of the rotor when rotating at a high speed is effectively reduced, and a obstruction of the connection hole of the rotor to the magnetic flux can be avoided, thereby improving the efficiency of the motor.

BRIEF DESCRIPTION OF THE DRAWINGS

The accompanying drawings constituting a part of the present disclosure are provided to further understand the present disclosure. The exemplary embodiments of the present disclosure and the description are used for explaining the present disclosure, but not intended to limit the present disclosure. In the drawings.

Figure 1:
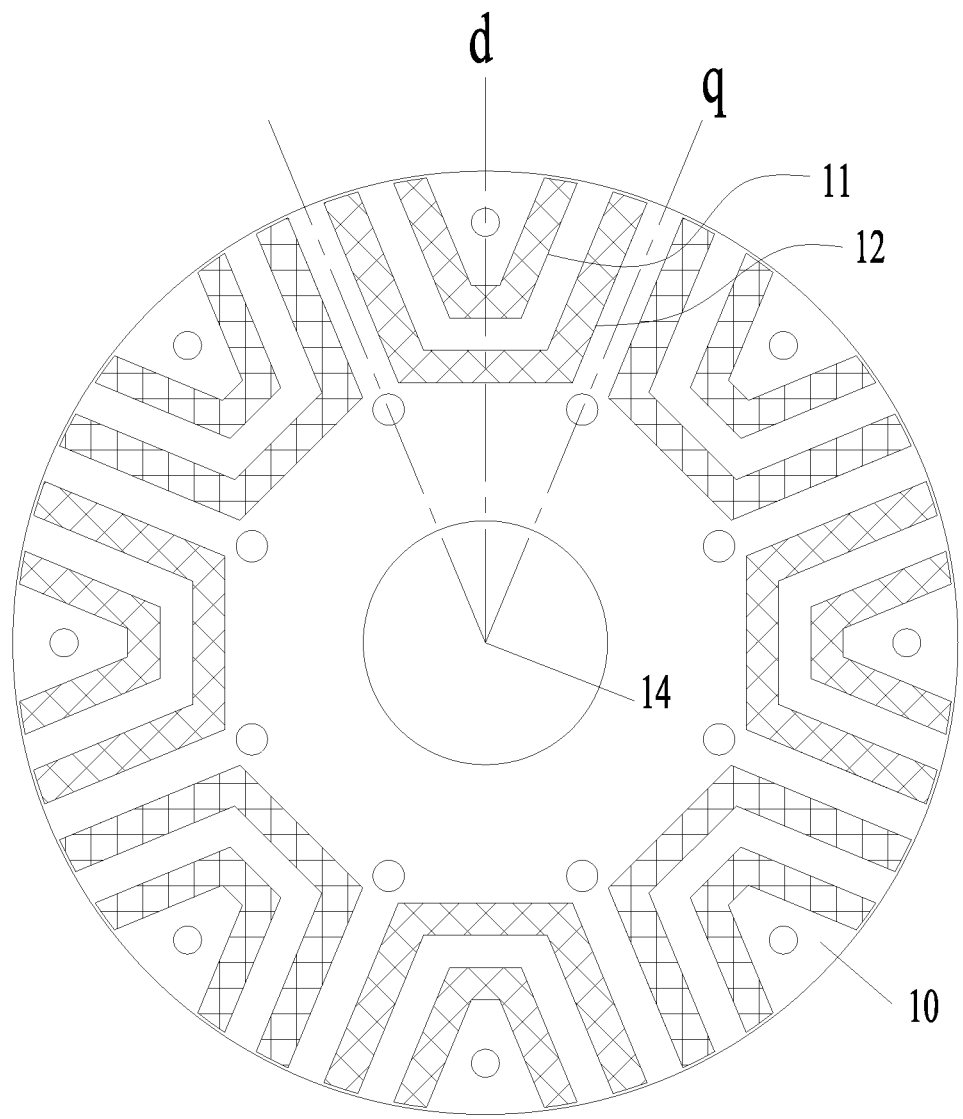
FIG. 1 is a schematic cross-sectional structure diagram of an existing rotor structure according to an embodiment.

The above drawings include following reference signs:
10, rotor body;
11, outer layer of permanent magnet slot; 111, first outer layer of permanent magnet slot; 112, second outer layer of permanent magnet slot; 113, air slot; 114, first bent slot; 115, second bent slot;
12, inner layer of permanent magnet slot; 13, magnetic conduction channel; 131, connection hole; 14, rotating shaft hole;
20, permanent magnet;
30, stator; 31, winding.

DETAILED DESCRIPTION OF THE EMBODIMENTS

It should be noted that the embodiments and the features in the embodiments of the present disclosure can be combined with each other without conflict. The present disclosure will be described in detail below with reference to the accompanying drawings and in conjunction with the embodiments.

As shown in FIG. 2 to FIG. 8, a rotor structure is provided according to an embodiment of the present disclosure.

Specifically, the rotor structure includes a rotor body 10 on which a permanent magnet slot group is provided. The permanent magnet slot group includes an outer layer of permanent magnet slot 11 and an inner layer of permanent magnet slot 12. A magnetic conduction channel 13 is formed between the outer layer of permanent magnet slot 11 and the inner layer of permanent magnet slot 12, and the magnetic conduction channel 13 is provided with a connection hole 131.

In the embodiment, by providing the connection hole 131 on the magnetic conduction channel 13 formed between the outer layer of permanent magnet slot 11 and the inner layer of permanent magnet slot 12, the deformation of the rotor when the rotor rotates at a high speed is effectively reduced, and the obstruction of the connection hole of the rotor to the magnetic flux can be avoided, thereby improving the efficiency of the motor.

Figure 2:
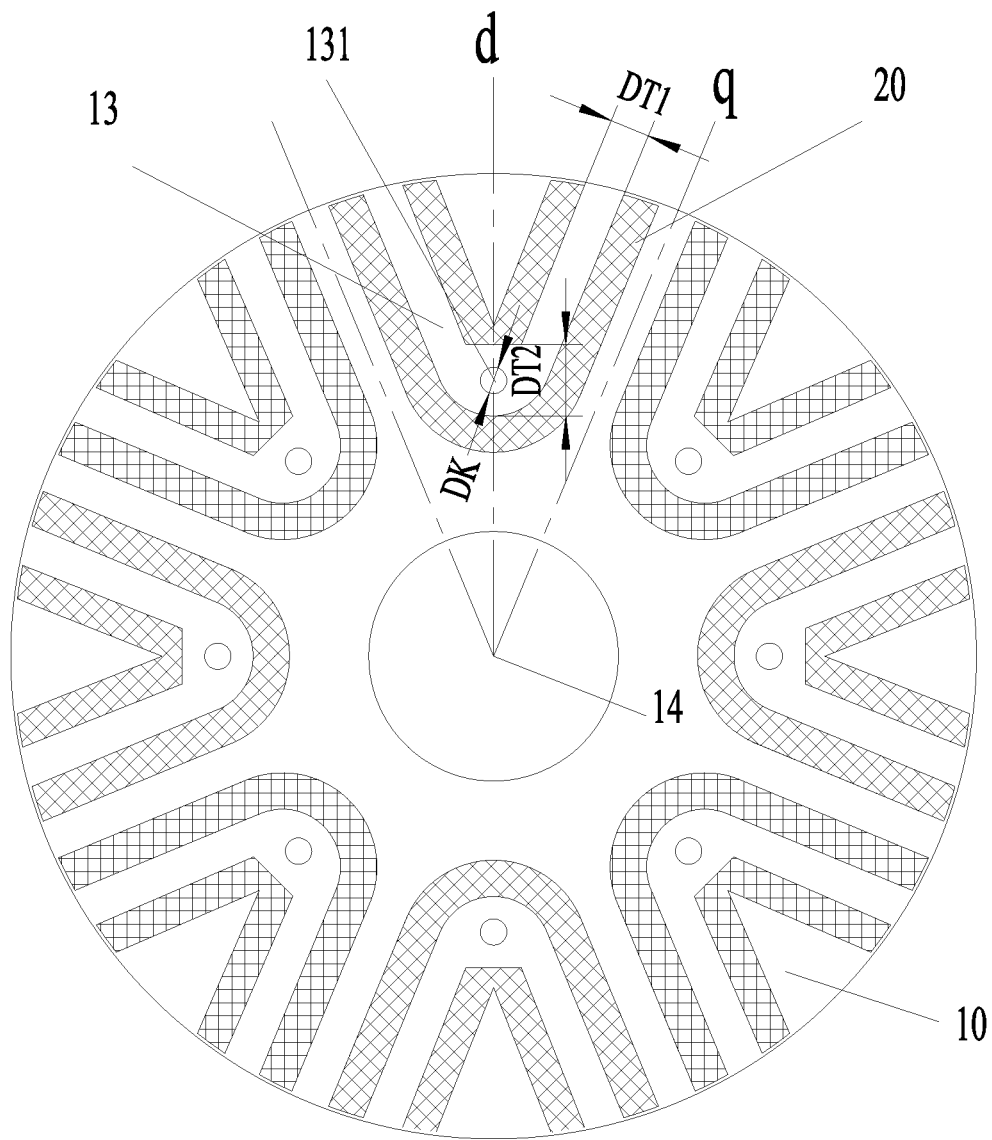
FIG. 2 is a schematic cross-sectional structure diagram of a rotor structure according to an embodiment I of the present disclosure.

As shown in FIG. 2, a width of the magnetic conduction channel 13 adjacent to an outer edge of the rotor body 10 is DT1, a width of magnetic conduction channel 13 adjacent to a rotating shaft hole 14 of the rotor body 10 is DT2, and a diameter of the connection hole 131 is DK, satisfying (DT1+DK)≤DT2. Such an arrangement can effectively alleviate the magnetic saturation of a region on the magnetic conduction channel 13 where the connection hole 131 is provided, increase a q-axis inductance of the motor, and increase a reluctance torque of the motor.

Further, 1.3×DT1≤DT2. Such an arrangement can effectively alleviate the magnetic saturation of the region on the magnetic conduction channel 13 where the connection hole 131 is provided, increase the q-axis inductance of the motor, and increase the reluctance torque of the motor.

In the embodiment, the outer layer of permanent magnet slot 11 includes a first outer layer of permanent magnet slot 111 and a second outer layer of permanent magnet slot 112. The first outer layer of permanent magnet slot 111 is located on a first side of a direct axis (d-axis) of the rotor body 10. A first end of the first outer layer of permanent magnet slot 111 is arranged to extend toward the rotating shaft hole 14 of the rotor body 10 and gradually approach the direct axis of the rotor body 10. A second end of the first outer layer of permanent magnet slot 111 is arranged to extend toward the outer edge of the rotor body 10 and gradually away from the direct axis of the rotor body 10. The second outer layer of permanent magnet slot 112 is located on a second side opposite to the first side of the direct axis of the rotor body 10. A first end of the second outer layer of permanent magnet slot 112 is arranged to extend toward the rotating shaft hole 14 of the rotor body 10 and gradually approach the direct axis of the rotor body 10. A second end of the second outer layer of permanent magnet slot 112 is arranged to extend toward the outer edge of the rotor body 10 and gradually away from the direct axis of the rotor body 10. Such an arrangement can better guide the magnetic field lines of a stator into each magnetic conduction channel more evenly.

The first end of the first outer layer of permanent magnet slot 111 is in communication with the first end of the second outer layer of permanent magnet slot 112. Such an arrangement can better conduct the magnetic field lines.

In the embodiment, the outer layer of permanent magnet slot 11 further includes an air slot 113. A first end of the air slot 113 is in communication with the first end of the first outer layer of permanent magnet slot 111, and a second end of the air slot 113 is in communication with the first end of the second outer layer of permanent magnet slot 112. Such an arrangement can better guide the magnetic field lines, and obtain a larger q-axis inductance.

In the embodiment, the outer layer of permanent magnet slot 11 further includes a first bent slot 114. A first end of the first bent slot 114 is in communication with the second end of the first outer layer of permanent magnet slot 111. A second end of the first bent slot 114 is arranged to extend toward the outer edge of the rotor body 10 and gradually away from the direct axis of the rotor body 10. A first angle is formed between a geometric central line of the first bent slot 114 and a geometric central line of the first outer layer of permanent magnet slot 111. By providing the angle between the permanent magnet slot and bent slot, it can more effectively guide the q-axis magnetic flux linkage lines of the stator 30 into each magnetic conduction channel more evenly, increase the q-axis inductance of the motor, and increase the reluctance torque of the motor.

Further, a width from the first end to the second end of the first bent slot 114 is gradually decreased. Such an arrangement can better guide the magnetic field lines, and obtain a larger q-axis inductance.

Figure 4:
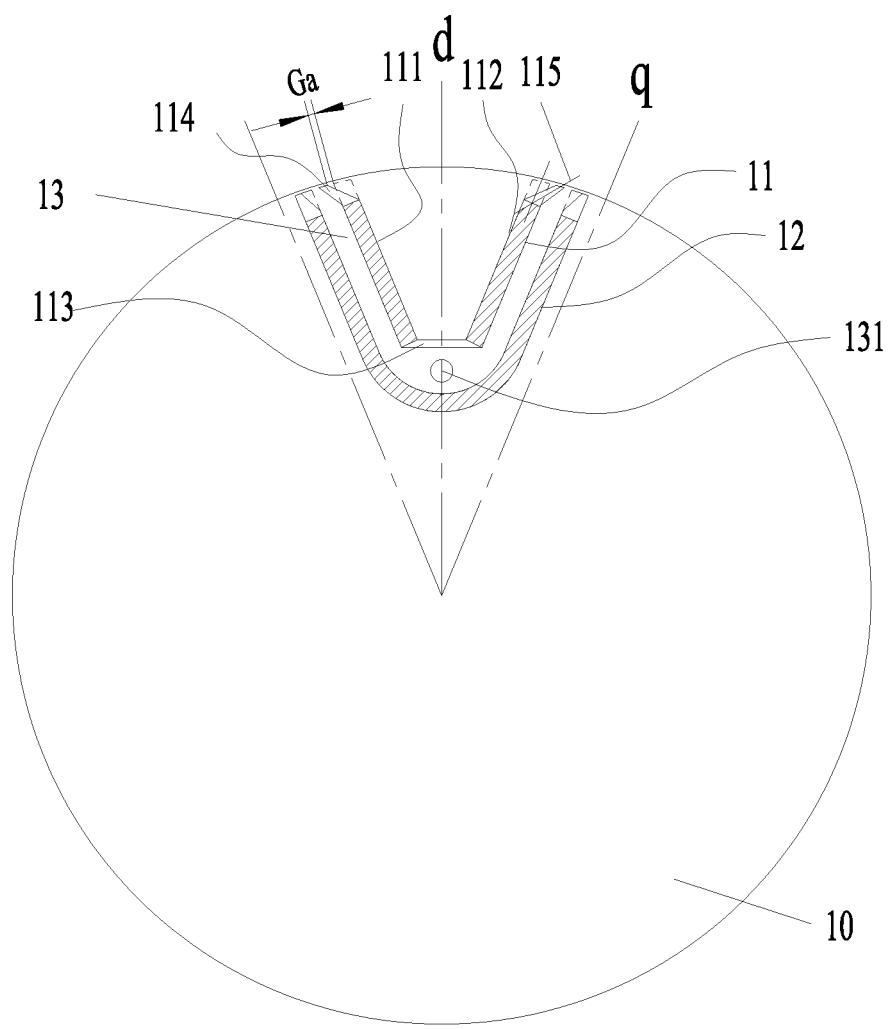
FIG. 4 is a schematic cross-sectional structure diagram of a rotor structure according to an embodiment III of the present disclosure.

As shown in FIG. 4, a distance between an end of a side wall of the first bent slot 114 adjacent to the direct axis of the rotor body 10 and an extension line of a side wall of the first outer layer of permanent magnet slot 111 away from the direct axis of the rotor body 10 is Ga, satisfying Ga=N×g, and g is a length of an air gap between the stator and the rotor, and N is an integer. Such an arrangement can effectively reduce the harmonic magnetic field content of the air gap, and reduce a harmonic loss and a torque ripple of the motor.

In the embodiment, the outer layer of permanent magnet slot 11 further includes a second bent slot 115. A first end of the second bent slot 115 is in communication with the second end of the second outer layer of permanent magnet slot 112, and a second end of the second bent slot 115 is arranged to extend toward the outer edge of the rotor body 10 and gradually away from the direct axis of the rotor body 10. A second angle is formed between a geometric central line of the second bent slot 115 and a geometric central line of the first outer layer of permanent magnet slot 111. Such an arrangement can better guide the magnetic field lines, and obtain a larger q-axis inductance.

In the embodiment, the rotor structure further includes a plurality of permanent magnets 20. The plurality of permanent magnets 20 are disposed in the first outer layer of permanent magnet slot 111, the second outer layer of permanent magnet slot 112, and the inner layer of permanent magnet slot 12, respectively. Such an arrangement can guide the magnetic field lines of the stator into each magnetic conduction channel more evenly.

Lengths of the permanent magnets 20 respectively disposed in the first outer layer of permanent magnet slot 111 and the second outer layer of permanent magnet slot 112 are L. A maximum width between a permanent magnet 20 disposed in the first outer layer of permanent magnet slot 111 and a permanent magnet 20 disposed in the second outer layer of permanent magnet slot 112 is C, satisfying 0.8×C≤L. Such an arrangement allows more permanent magnets to be disposed in the same rotor, thereby increasing the efficiency and anti-demagnetization capability of the motor.

In the embodiment, for the permanent magnet 20 provided in the first outer layer permanent magnet slot 111, a third angle α1 is formed between a connection line which is formed by connecting a side wall of the permanent magnet 20 adjacent to the direct axis of the rotor body 10 and adjacent to the edge of the rotor body 10 with the rotating shaft hole 14 of the rotor body 10, and the direct axis of the rotor body 10. For the permanent magnet 20 provided in the inner layer of permanent magnet slot 12, a fourth angle α2 is formed between a connection line which is formed by connecting a side wall of the permanent magnet 20 adjacent to the direct axis of the rotor body 10 and adjacent to the edge of the rotor body 10 with the rotating shaft hole 14 of the rotor body 10, and the direct axis of the rotor body 10, satisfying 1.5×(sin α1/sin α2)≤S1/S2≤1.8×(sin α1/sin α2), where S1 is a sum of a surface area of one side of the permanent magnet 20 disposed in the first outer layer of permanent magnet slot 111 adjacent to the direct axis of the rotor body 10 and a surface area of one side of the permanent magnet 20 disposed in the second outer layer of permanent magnet slot 112 adjacent to the direct axis of the rotor body 10, and S2 is a surface area of the permanent magnet 20 disposed in the inner layer of permanent magnet slot 12 adjacent to the direct axis of the rotor body 10. By setting the arrangement shape of the outer-layer of permanent magnet and a ratio of a thickness of the inner layer of the permanent magnet to a thickness of the outer-layer of permanent magnet, a working point of the permanent magnet can be better adjusted, so that the average working point of the inner layer and outer layer of the permanent magnets is higher.

In the embodiment, a connection line formed by connecting a midpoint of a side wall of the air slot 113 adjacent to the edge of the rotor body 10 with the edge of the rotor body 10 has a midpoint P. a distance between the rotating shaft hole 14 of the rotor body 10 and the point P is taken as a radius, and a circular arc is made with the radius along the circumferential direction of the rotor body 10. A sum of thicknesses of the permanent magnets 20 intersecting the circular arc is M1, and a circumference of the circular arc is C1, where $M1/C1=T2$ and $55\% \leq T2 \leq 65\%$. Such an arrangement can ensure a higher working point of the permanent magnet, obtain a larger anti-demagnetization capability and a higher no-load flux linkage of motor, and enable the motor to obtain a larger difference between the quadrature-axis inductance and the direct-axis inductance, and increase the reluctance torque of the motor.

In the embodiment, the width of the magnetic conduction channel 13 gradually decreases outwardly in a radial direction of the rotor body 10. Such an arrangement can allow more magnetic field lines of the stator 30 to enter the magnetic conduction channel, and allow the rotor to obtain a larger reluctance torque, thereby improving the working efficiency of the rotor.

The number of at least one of the outer layer of permanent magnet slot 11 and the inner layer of permanent magnet slot 12 is multiple. Such an arrangement can allow the rotor to obtain a larger reluctance torque, thereby improving the working efficiency of the rotor.

In the embodiment, the inner layer of permanent magnet slot 12 has a U-shaped structure, and an arc-shaped portion of the inner layer of permanent magnet slot 12 is arranged to protrude toward the rotating shaft hole 14 of the rotor body 10. Such an arrangement can further adjust a distribution of the magnetic field lines of each magnetic conduction channel, and reduce the local saturation.

The rotor structure in the above-mentioned embodiments can also be used in the field of motor equipment technology, that is, according to another aspect of the present disclosure, a permanent magnet auxiliary synchronous reluctance motor is provided. The motor includes a rotor structure which is the rotor structure in the above-mentioned embodiments.

The rotor structure in the above-described embodiments can also be used in the field of vehicle equipment technology, that is, according to another aspect of the present disclosure, an electric vehicle is provided. The electric vehicle includes a rotor structure which is the rotor structure as described above.

As shown in FIG. 1, in order to increase the mechanical strength of the rotor, an existing permanent magnet auxiliary synchronous reluctance motor is generally provided with a connection hole on the rotor, and a structural reinforcing rod such as a rivet or a screw is placed in the connection hole. In general, there are two arrangement modes for the connection hole of the rotor. In one arrangement mode, the connection hole of the rotor is located between the permanent magnet slot and the shaft hole, such as the connection hole at a bottom of the rotor as shown in FIG. 1. Since the region in which the rotor is easily deformed is an region outside the permanent magnet slot when the rotor rotates at a high speed, such connection hole at the bottom of the rotor is less effective in suppressing the deformation of the rotor. In the other arrangement mode, the connection hole of the rotor is located at the outermost region of the permanent magnet slot, so that the deformation of the rotor in this region can be effectively suppressed. However, in this manner, the magnetic field lines of the permanent magnet are easily blocked from entering the stator, which may cause a problem of reduced motor efficiency.

Figure 3:
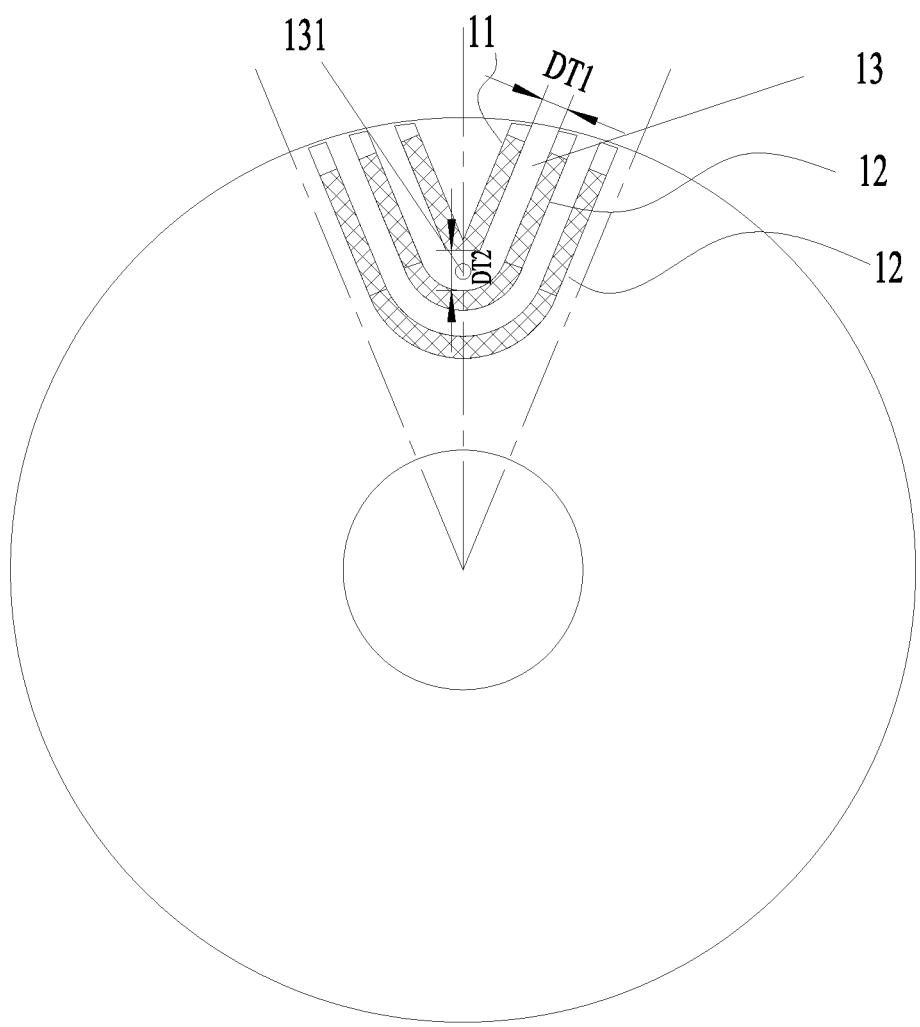
FIG. 3 is a schematic cross-sectional structure diagram of a rotor structure according to an embodiment II of the present disclosure.

To this end, the present disclosure proposes a motor provide with a new arrangement of connection holes of the rotor. The motor includes a stator and a rotor. The stator includes a stator core and a stator winding 31 embedded in the stator core. The rotor includes a permanent magnet slot and a permanent magnet disposed in the permanent magnet slot. The rotor includes multiple layers of permanent magnets on a same magnetic pole. In the present technical solution, multiple layers refer to that the number of layers is greater than or equal to two. The permanent magnets on the same magnetic pole has the same polarity toward the stator. The permanent magnet slot has a shape protruding toward the inner side of the rotor, both ends of the permanent magnet slot are adjacent to an outer edge of the rotor, and a center of the permanent magnet slot is adjacent to the inner side of the rotor. A magnetic conduction channel is formed between any two adjacent permanent magnet slots on the same magnetic pole. The magnetic conduction channel has a region with an increased thickness adjacent to the bottom of the rotor, in the region a connection hole of the rotor is arranged, as shown in FIG. 2 and FIG. 3. By arranging the connection hole of the rotor at the bottom of the magnetic conduction channel, the deformation of the rotor when the rotor rotates at a high speed is effectively reduced, and the obstruction of the connection hole of the rotor to the magnetic flux can be avoided, thereby improving the efficiency of the motor.

In the embodiment, by setting the thickness DT2 of the region with the increased thickness of the magnetic conduction channel 13 to be not less than 1.3 times the width DT1 of the magnetic conduction channel adjacent to the outer edge of the rotor, or by setting the width DT2 of the magnetic conduction channel to be not less than the sum of the width DT1 of the magnetic conduction channel and the diameter DK of the connection hole, accordingly, the magnetic saturation of a region on the magnetic conduction channel 13 where the connection hole 131 of the rotor is placed can be effectively alleviated, the q-axis inductance of the motor is increased, and the reluctance torque of the motor is increased.

A bottom portion of the permanent magnet slot adjacent to the magnetic conduction channel in which the connection hole of the rotor is disposed and adjacent to the center of the rotor has an arc shape protruding toward the inner side of the rotor. By setting the permanent magnet slot to have the arc shape, more permanent magnets can be disposed under a condition of forming the same width DT2 of the magnetic conduction channel, thereby increasing the no-load flux linkage of the motor.

The permanent magnet slot adjacent to the magnetic conduction channel in which the connection hole of the rotor is disposed and adjacent to an outer side of the rotor is substantially V-shaped, which can form a magnetic conduction channel of DT2 width with a larger thickness more easily.

As shown in FIG. 4, an innermost layer of permanent magnet of the rotor is taken as a first layer, an end of the second layer permanent magnet slot calculated from inside to outside has a turn deflecting toward the end of the inner layer permanent magnet slot.

Figure 5:
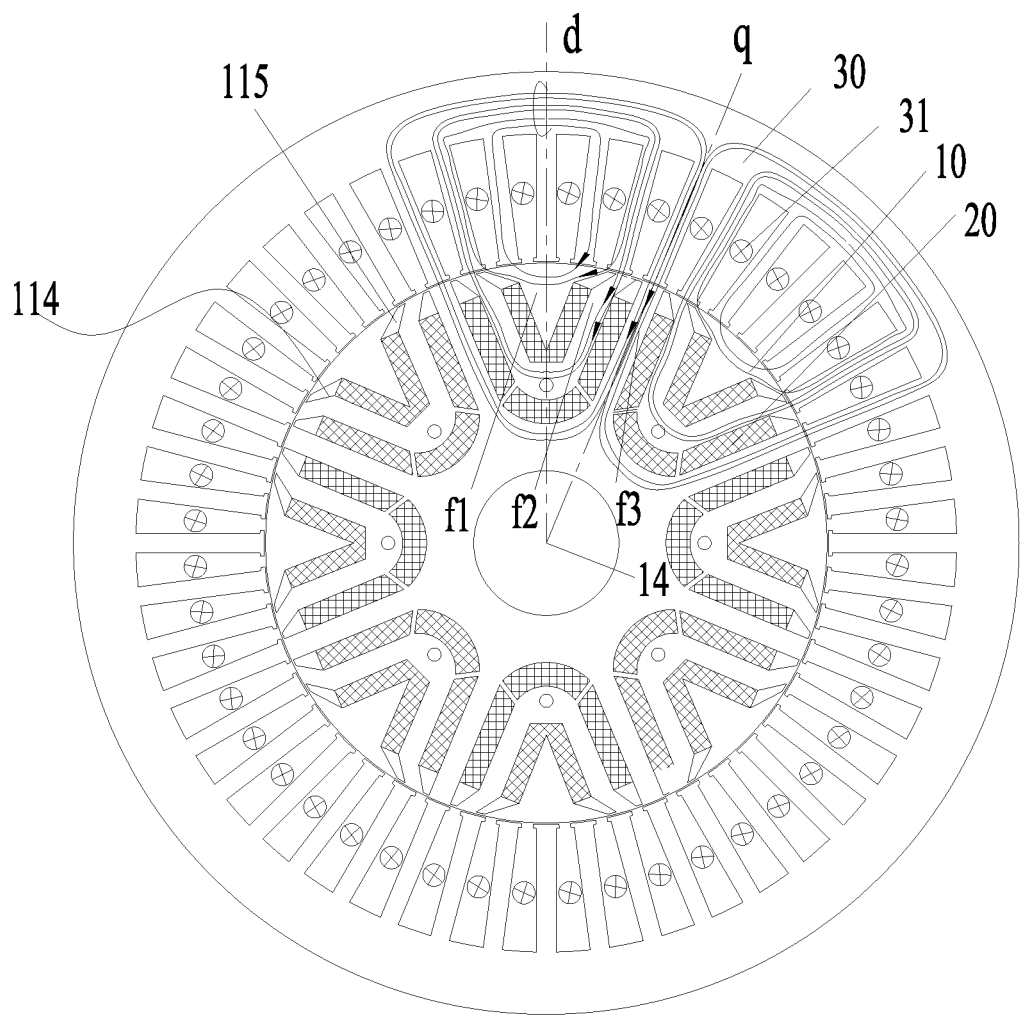
FIG. 5 is a schematic cross-sectional structure diagram of a rotor structure according to an embodiment IV of the present disclosure.

As shown in FIG. 5, the study finds that when three-phase symmetrical alternating current flows through the stator of the motor, the distribution of the magnetic field lines on each tooth of the stator is uneven. In the position closer to the boundary line, there are more magnetic field lines distributed on the teeth of the stator.

Figure 7:
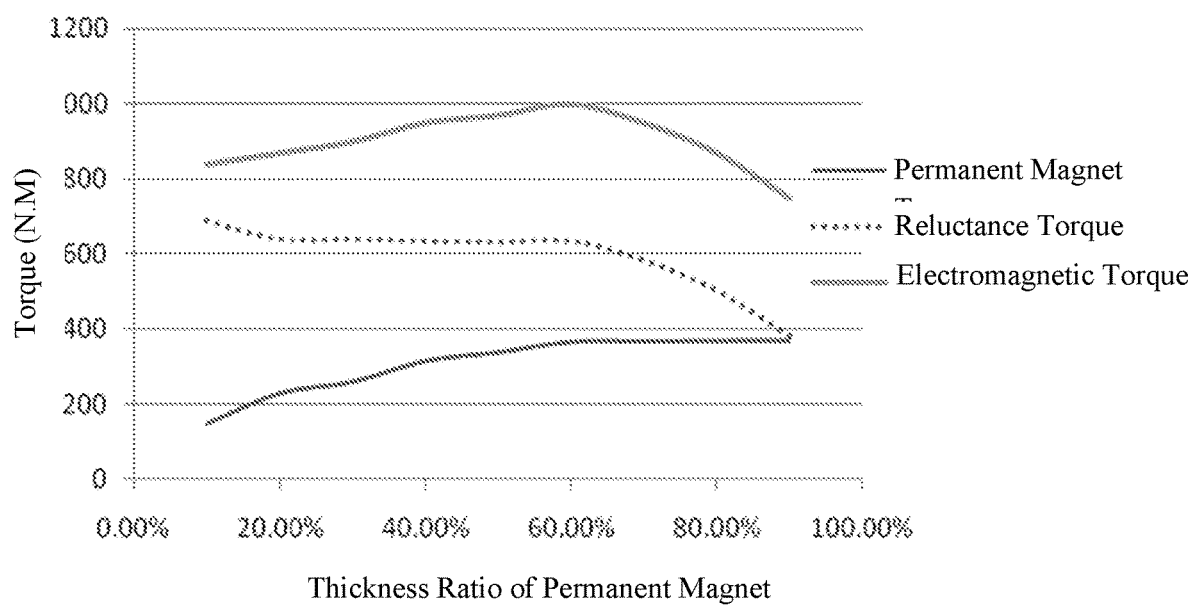
FIG. 7 is a schematic diagram showing a relationship between a thickness ratio of a permanent magnet and a torque of the rotor structure.

Further, the q-axis magnetic flux linkage lines enter three magnetic conduction channels from the stator teeth respectively. A magnetic conduction channel f3 is formed between two innermost layers of permanent magnet slots of two adjacent magnetic poles; a magnetic conduction channel f2 is formed between the innermost layer of permanent magnet slot and the second layer of permanent magnet slot; and a magnetic conduction channel f1 is formed by a magnetic conduction region between the second layer of permanent magnet slot and the outer edge of the rotor. Due to the uneven distribution of the magnetic field lines in the stator teeth, the most magnetic field lines enter the magnetic conduction channel f3, and the fewest magnetic field lines enter the magnetic conduction channel f1. The magnetic circuits of the magnetic conduction channel f3 and the magnetic conduction channel f2 are relatively saturated. When the motor load is heavier, the q-axis inductance of the motor is greatly decreased, thus affecting the usage of the reluctance torque of the motor, and this phenomenon becomes more serious especially for a ferrite permanent magnet auxiliary synchronous reluctance motor, because in this case, in order to improve the efficiency and anti-demagnetization capability of the motor, the permanent magnet is thicker, and it is difficult to increase the width of the magnetic conduction channel. To this end, the present solution provides that an end of the magnetic conduction channel has a turn deflecting toward an end of the inner layer of permanent magnet. The distribution of the q-axis magnetic field lines f of the motor is shown in FIG. 7. By providing that the end of the magnetic conduction channel has a turn deflecting toward the end of the inner layer of permanent magnet slot, directions of the q-axis magnetic field lines f of the stator can be effectively guided, and the magnetic field lines which originally enter the high magnetic saturation region, such as the magnetic field lines entering the magnetic conduction channel f2 shown in the figure, are changed to enter the low magnetic saturation region such as the magnetic conduction channel f1 shown in the figure. Accordingly, more magnetic fluxes are generated under the same exciting current, thereby improving the q-axis inductance of the motor, increasing the reluctance torque of the motor, and improving the efficiency and the power density of the motor.

In the embodiment, compared to an end point of the end edge line of the second layer of permanent magnet slot adjacent to the inner side before turning, an end point of the end edge line of the second layer of permanent magnet slot adjacent to the outer side is closer to the q-axis of the rotor. Such arrangement is for implementing a better guidance effect of the magnetic field lines.

The shape of the end of the magnetic conduction channel before turning is determined by the following method: when a flat permanent magnet is installed in the permanent magnet slot, two side edge lines of the permanent magnet slot are extended, and a distance between an outer edge line of the permanent magnet slot adjacent to the rotor and the outer edge of the rotor is unchanged after the permanent magnet slot is bent. When an arc-shaped permanent magnet is installed in the permanent magnet slot, an arc-shaped tangent line is taken at an end point of the arc-shaped permanent magnet slot, and the tangent line is extended, and a distance between an outer edge line of the permanent magnet slot adjacent to the rotor and the outer edge of the rotor is unchanged after the permanent magnet slot is bent. Further, a distance between the end point of the end edge line of the bent slot of the second layer of permanent magnet slot adjacent to the outer side and the end point of the end edge line of the second layer of permanent magnet slot adjacent to the inner side before turning is Ga, and the distance Ga is substantially equal to an integral multiple of a length g of an air gap between the stator and the rotor. By setting the distance Ga to be substantially the integral multiple of the length g of the air gap between the stator and the rotor, the harmonic magnetic field content in the air gap can be effectively reduced, thereby reducing the harmonic loss and the torque ripple of the motor. The substantial equation herein ranges from 0.95 times to 1.05 times. In addition, there is no permanent magnet placed in the bent portion at the end of the permanent magnet slot, which can effectively alleviate the local demagnetization of the end of the permanent magnet and improve the anti-demagnetization ability of the motor.

Figure 6:
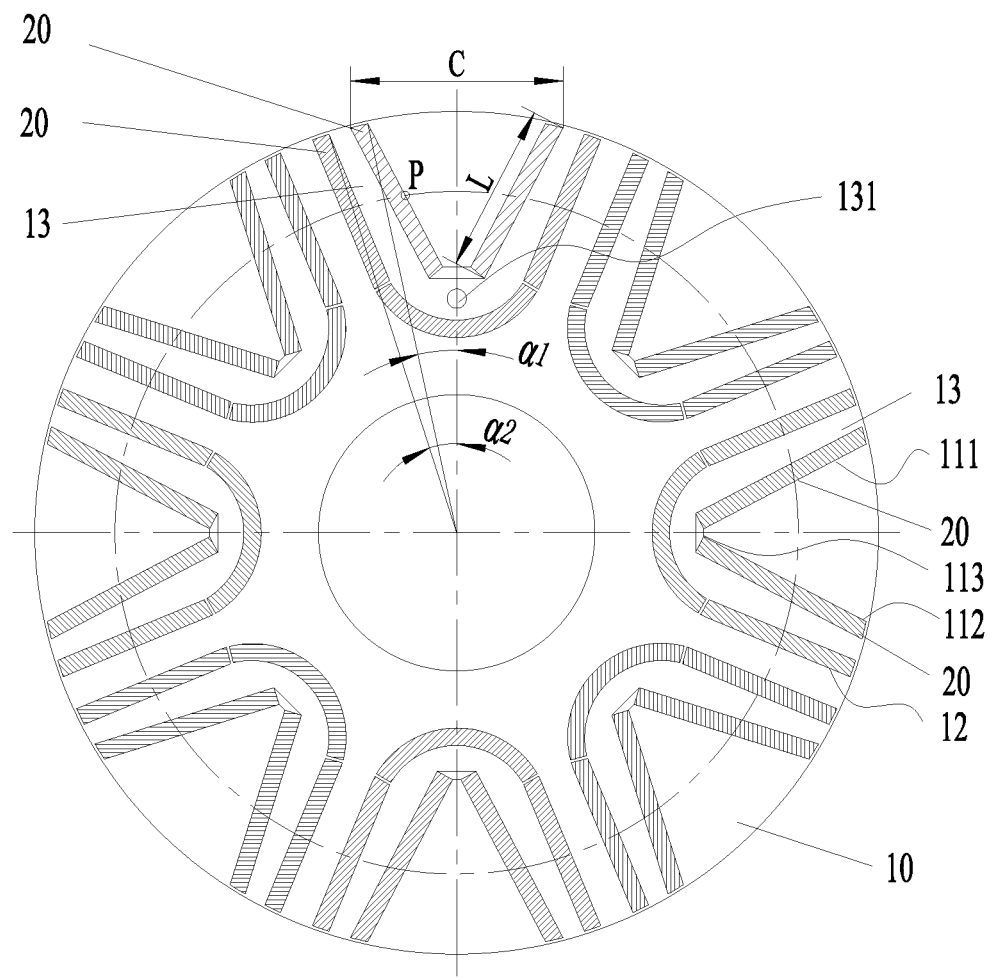
FIG. 6 is a schematic cross-sectional structure diagram of a rotor structure according to an embodiment V of the present disclosure.

As shown in FIG. 6 and FIG. 7, the permanent magnet of the rotor of the motor is a ferrite permanent magnet. An arc centered on a center of the rotor is made, and the arc passes through a midpoint P of an outer edge line of the outermost layer of permanent magnet. A ratio of a total sum of thicknesses of the permanent magnets of the rotor at the arc to a circumference of the arc is 45% to 70%. When the permanent magnet of the rotor of the motor is the ferrite permanent magnet, by setting the thickness of the permanent magnet to be in the above-mentioned range, a ratio of the thickness of the permanent magnet to the thickness of the magnetic conduction channel is made in a better range, which can ensure a higher working point of the permanent magnet, thereby achieving a larger anti-demagnetization capability and a higher no-load flux linkage of the motor; moreover, the motor can achieve a larger difference between the quadrature-axis inductance and the direct-axis inductance, thereby improving the reluctance torque of the motor.

Further, in order to enhance the mechanical strength of the rotor, one or more magnetic isolation bridges are formed between layers of permanent magnet slots.

Further, two ends of the inner layer of permanent magnet slot of the rotor adjacent to the outer edge of the rotor are respectively provided with a flat permanent magnet, and an end of the second layer of permanent magnet slot adjacent to the outer edge of the rotor is provided with a flat permanent magnet. By providing the flat permanent magnet at the end of the permanent magnet slot, more permanent magnets can be placed in the same rotor, thereby improving the efficiency and the anti-demagnetization capability of the motor.

As shown in FIG. 6, there are two layers of permanent magnets of the rotor. The outer layer of permanent magnet slot is substantially V-shaped. A length of the permanent magnet on one side of the V-shaped permanent magnet slot is L, a maximum width of the V-shaped permanent magnet is C, satisfying $0.8 \times C \leq L$. The outer layer of permanent magnet slot is substantially U-shaped and consists of at least three sections of permanent magnets. A ratio of a surface area of the outer layer of permanent magnet adjacent to the outer side of the rotor to a surface area of the inner layer of permanent magnet adjacent to the outer side of rotor is S1/S2. An angle formed by an outer vertex of the end of the outer layer of permanent magnet adjacent to the outside surface of the rotor and the center of the rotor is 2×α1, and an angle formed by an outer vertex of the end of the inner layer of permanent magnet adjacent to the outside surface of the rotor and the center of the rotor is 2×α2, and the following relationship is satisfied: 1.3×(sin α1/sin α2)≤S1/S2≤2×(sin α1/sin α2).

Figure 8:
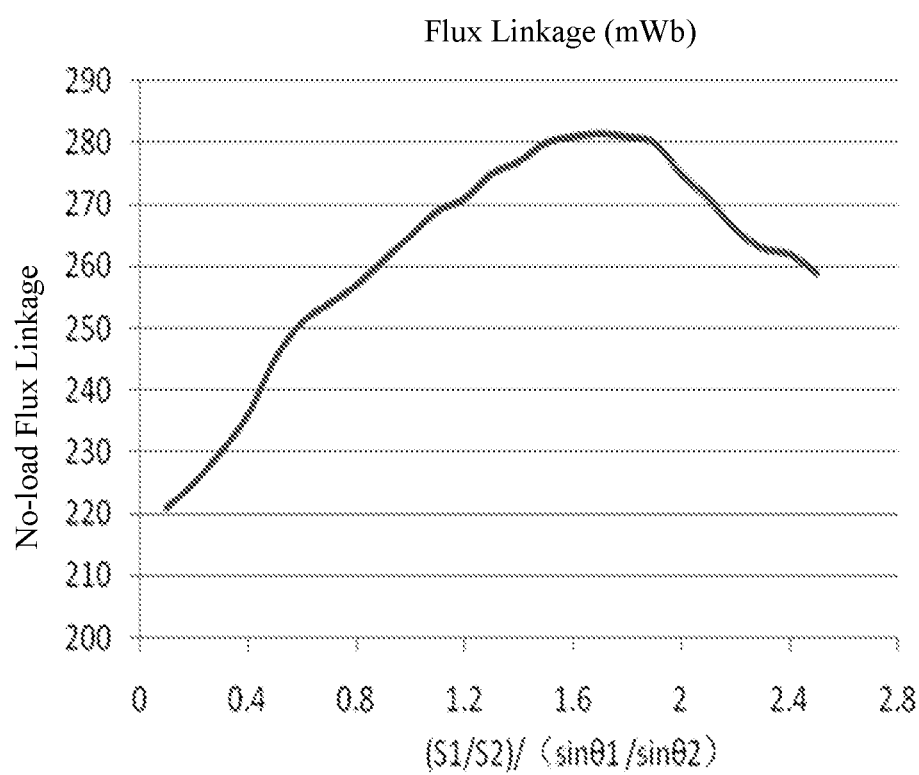
FIG. 8 is a schematic diagram showing an effect of a ratio of an area of an inner layer of permanent magnet slot to an area of an outer layer of permanent magnet slot of the rotor structure on a flux linkage.

As shown in FIG. 8, by setting the arrangement shape of the outer layer of permanent magnet and the ratio of the area of the inner layer of permanent magnet to the area of the outer layer of permanent magnet, the working point of the permanent magnet can be better adjusted, so that an average working point of the inner layer and outer layer of permanent magnet becomes higher, and a proportion of the magnetic field lines of the inner layer of permanent magnet entering the outer layer of permanent magnet and that directly entering the stator 30 are more reasonable. Accordingly, the permanent magnet flux linkage of the motor is increased, thereby improving the efficiency and the power factor of the motor. The effect of the ratio of the surface area of the inner layer of permanent magnet to the surface area of the outer layer of permanent magnet on the magnetic flux linkage of the motor are shown in the figure. By setting the ratio of the surface area of the inner layer of permanent magnet to the surface area of the outer layer of permanent magnet to satisfy: 1.3×(sin α1/sin α2)≤S1/S2≤2×(sin α1/sin α2), a larger no-load flux linkage of the motor can be achieved. Preferably, 1.5×(sin α1/sin α2)≤S1/S2≤1.8×(sin α1/sin α2).

Further, the width of the magnetic conduction channel formed by the inner layer of rectangular permanent magnet and the outer layer of rectangular permanent magnet is not constant. The width of a portion of the magnetic conduction channel adjacent to the outer surface of the rotor is smaller. By designing the width of the magnetic conduction channel to be gradually reduced, all magnetic poles of the rotor are evenly distributed on the circumference of rotor. The magnetic flux areas of the inner layer and outer layer of permanent magnets can be better adjusted, to achieve a consistent adjustment of the working points of the inner layer and outer layer of permanent magnets.

In addition, the motor in the embodiments can serve as a drive motor of an electric vehicle, accordingly. the cost of the motor can be reduced, and the dependence of the new energy electric vehicle on the rare earth resources can be effectively reduced. Meanwhile, the motor of the present disclosure has the advantages of the high efficiency of the rare earth permanent magnet motor and the high reliability of the asynchronous motor, and can better promote the development of the new energy vehicle.

What described above are preferred embodiments of the present disclosure, but not intended to limit the present disclosure. For those skilled in the art, various amendments and modifications can be made. Any modifications, equivalent substitutions and improvements made within the spirits and principles of the present invention are all within the scope of protection of the present disclosure.

What is claimed is:

1. A rotor structure, comprising:
    a rotor body provided with a permanent magnet slot group; wherein the permanent magnet slot group comprises an outer layer of permanent magnet slot and an inner layer of permanent magnet slot, a magnetic conduction channel is formed between the outer layer of permanent magnet slot and the inner layer of permanent magnet slot, the magnetic conduction channel is provided with a connection hole, a width of the magnetic conduction channel adjacent to an outer edge of the rotor body is DT1, a width of the magnetic conduction channel adjacent to a rotating shaft hole of the rotor body is DT2, a diameter of the connection hole is DK, satisfying (DT1+DK)≤DT2.

2. The rotor structure according to claim 1, satisfying 1.3×DT1≤DT2.

3. The rotor structure according to claim 1, wherein, the outer layer of permanent magnet slot comprises:
    a first outer layer of permanent magnet slot located on a first side of a direct axis of the rotor body, a first end of the first outer layer of permanent magnet slot arranged to extend toward the rotating shaft hole of the rotor body and gradually approach the direct axis of the rotor body, a second end of the first outer layer of permanent magnet slot arranged to extend toward the outer edge of the rotor body and gradually away from the direct axis of the rotor body; and
    a second outer layer of permanent magnet slot located on a second side opposite to the first side of the direct axis of the rotor body, a first end of the second outer layer of permanent magnet slot arranged to extend toward the rotating shaft hole of the rotor body and gradually approach the direct axis of the rotor body, a second end of the second outer layer of permanent magnet slot arranged to extend toward the outer edge of the rotor body and gradually away from the direct axis of the rotor body.

4. The rotor structure according to claim 3, wherein, the first end of the first outer layer of permanent magnet slot is in communication with the first end of the second outer layer of permanent magnet slot.

5. The rotor structure according to claim 3, wherein, the outer layer of permanent magnet slot further comprises:
    an air slot, wherein a first end of the air slot is in communication with the first end of the first outer layer of permanent magnet slot, and a second end of the air slot is in communication with the first end of the second outer layer of permanent magnet slot.

6. The rotor structure according to claim 5, wherein, the rotor structure further comprises:
    a plurality of permanent magnets; wherein the plurality of permanent magnets are respectively disposed in the first outer layer of permanent magnet slot, the second outer layer of permanent magnet slot, and the inner layer of permanent magnet slot.

7. The rotor structure according to claim 6, wherein, lengths of the permanent magnets respectively disposed in the first outer layer of permanent magnet slot and the second outer layer of permanent magnet slot are L, and a maximum width between the permanent magnet disposed in the first outer layer of permanent magnet slot and the permanent magnet disposed in the second outer layer of permanent magnet slot is C, satisfying 0.8×C≤L.

8. The rotor structure according to claim 6, wherein, a permanent magnet is disposed in the first outer layer of permanent magnet slot, a third angle α1 is formed between a connection line which is formed by connecting a side wall of the permanent magnet adjacent to the direct axis of the rotor body and adjacent to an edge of the rotor body with the rotating shaft hole of the rotor body, and the direct axis of the rotor body; a permanent magnet is disposed in the inner layer of permanent magnet slot, a fourth angle α2 is formed between a connection line which is formed by connecting a side wall of the permanent magnet adjacent to the direct axis of the rotor body and adjacent to the edge of the rotor body with the rotating shaft hole of the rotor body, and the direct axis of the rotor body, satisfying $1.5\times(\sin\alpha1/\sin\alpha2)\leq S1/S2\leq 1.8\times(\sin\alpha1/\sin\alpha2)$, S1 is a sum of a surface area of one side of the permanent magnet disposed in the first outer layer of permanent magnet slot adjacent to the direct axis of the rotor body and a surface area of one side of the permanent magnet disposed in the second outer layer of permanent magnet slot adjacent to the direct axis of the rotor body, and S2 is a surface area of one side of the permanent magnet disposed in the inner layer of permanent magnet slot adjacent to the direct axis of the rotor body.

9. The rotor structure according to claim 6, wherein, a midpoint of a connection line formed by connecting a midpoint of a side wall of the air slot adjacent to an edge of the rotor body with the edge of the rotor body is a point P, a distance between the rotating shaft hole of the rotor body and the point P is taken as a radius, a circular arc is made with the radius along a circumferential direction of the rotor body, a sum of thicknesses of the permanent magnets intersecting the circular arc is M1, and a circumference of the circular arc is C1, satisfying $M1/C1=T2$, and $55\%\leq T2\leq 65\%$.

10. The rotor structure according to claim 3, wherein, the outer layer of permanent magnet slot further comprises:
a first bent slot, wherein a first end of the first bent slot is in communication with the second end of the first outer layer of permanent magnet slot, a second end of the first bent slot is arranged to extend toward the outer edge of the rotor body and gradually away from the direct axis of the rotor body, a first angle is formed between a geometric central line of the first bent slot and a geometric central line of the first outer layer of permanent magnet slot.

11. The rotor structure according to claim 10, wherein, a width of the first bent slot is gradually decreased from the first end to the second end of the first bent slot.

12. The rotor structure according to claim 10, wherein, a distance from an end of a side wall of the first bent slot adjacent to the direct axis of the rotor body to an extension line of a side wall of the first outer layer of permanent magnet slot away from the direct axis of the rotor body is Ga, wherein $Ga=N\times g$, g is a length of an air gap between a stator and a rotor, and N is an integer.

13. The rotor structure according to claim 10, wherein, the outer layer of permanent magnet slot further comprises:
a second bent slot, wherein a first end of the second bent slot is in communication with the second end of the second outer layer of permanent magnet slot, and a second end of the second bent slot is arranged to extend toward the outer edge of the rotor body and gradually away from the direct axis of the rotor body, a second angle is formed between a geometric central line of the second bent slot and a geometric central line of the second outer layer of permanent magnet slot.

14. The rotor structure according to claim 1, wherein, a width of the magnetic conduction channel is gradually decreased outwardly in a radial direction of the rotor body.

15. The rotor structure according to claim 1, wherein, a number of at least one of the outer layer of permanent magnet slot and the inner layer of permanent magnet slot is multiple.

16. The rotor structure according to claim 1, wherein, the inner layer of permanent magnet slot has a U-shaped structure, an arc-shaped portion of the inner layer of permanent magnet slot is arranged to protrude toward the rotating shaft hole of the rotor body.

17. A permanent magnet auxiliary synchronous reluctance motor, comprising a rotor structure, wherein the rotor structure is the same as that of claim 1.

18. An electric vehicle, comprising a rotor structure, wherein the rotor structure is the same as that of claim 1.

* * * * *